(12) United States Patent
Simonetti et al.

(10) Patent No.: US 10,961,915 B2
(45) Date of Patent: Mar. 30, 2021

(54) SYSTEMS AND METHODS FOR STARTING AN ENGINE

(71) Applicant: Sikorsky Aircraft Corporation, Stratford, CT (US)

(72) Inventors: Joseph L. Simonetti, Southbury, CT (US); Mark D. Bystry, Jr., Stratford, CT (US); Michael P. Strauss, New Haven, CT (US); Michael J. DeVita, Cos Cob, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 253 days.

(21) Appl. No.: 15/565,672

(22) PCT Filed: Apr. 13, 2016

(86) PCT No.: PCT/US2016/027345
§ 371 (c)(1),
(2) Date: Oct. 10, 2017

(87) PCT Pub. No.: WO2016/168340
PCT Pub. Date: Oct. 20, 2016

(65) Prior Publication Data
US 2018/0073437 A1    Mar. 15, 2018

Related U.S. Application Data

(60) Provisional application No. 62/148,067, filed on Apr. 15, 2015.

(51) Int. Cl.
*F02C 7/26* (2006.01)
*F01D 13/00* (2006.01)
*F02C 6/02* (2006.01)

(52) U.S. Cl.
CPC .............. *F02C 7/26* (2013.01); *F01D 13/00* (2013.01); *F02C 6/02* (2013.01); *F05D 2220/329* (2013.01); *F05D 2260/85* (2013.01)

(58) Field of Classification Search
CPC .... F02C 6/02; F02C 7/26; F02C 7/264; F02C 7/268; F02C 7/27; F02C 7/277;
(Continued)

(56) References Cited

U.S. PATENT DOCUMENTS 2,891,564 A    6/1959   Jeromson, Jr.
3,483,696 A   12/1969   Gilbert et al.
(Continued)

FOREIGN PATENT DOCUMENTS

GB          1032392 A    6/1966
GB          1116155 A    6/1968
WO     WO-2014/203053 A1   12/2014

OTHER PUBLICATIONS

PCT International Search Report and Written Opinion dated Jul. 22, 2016, issued during the prosecution of corresponding PCT International Patent Application No. PCT/US2016/27345 (12 pages).
(Continued)

*Primary Examiner* — Craig Kim
(74) *Attorney, Agent, or Firm* — Foley & Lardner LLP

(57) ABSTRACT

A system for starting a gas turbine engine includes a rotor drive system and a hydraulic motor system operatively connected to the rotor drive system. A gas turbine engine is operatively connected to the hydraulic motor system for starting the gas turbine engine. A method for starting an engine includes initiating single-engine-operation on a multi-engine aircraft. Single-engine operation includes operating a first engine and powering down a second engine. The method includes running a hydraulic motor system. The hydraulic motor system is driven by the rotor drive system (Continued)

and is operatively connected to the second engine. The method includes identifying a need to start the second engine and starting the second engine using the hydraulic motor system.

20 Claims, 4 Drawing Sheets

(58) Field of Classification Search
CPC .. F01D 13/00; F01D 13/003; F05D 2220/328; F05D 2220/329; F05D 2260/85; F05D 2270/09
See application file for complete search history.

(56) References Cited

U.S. PATENT DOCUMENTS

| | | | |
|---|---|---|---|
| 3,869,862 A | 3/1975 | Dickey | |
| 5,081,832 A | 1/1992 | Mowill | |
| 5,108,043 A | 4/1992 | Canavespe | |
| 5,435,125 A * | 7/1995 | Telakowski | F02C 7/277 60/625 |
| 6,929,215 B2 | 8/2005 | Arlton | |
| 7,121,391 B2 | 10/2006 | Kuo | |
| 7,552,582 B2 | 6/2009 | Eick et al. | |
| 2002/0166532 A1 | 11/2002 | Mori et al. | |
| 2007/0151258 A1* | 7/2007 | Gaines | F02C 7/36 60/792 |
| 2012/0180481 A1* | 7/2012 | Kapich | F02B 37/10 60/606 |
| 2013/0076120 A1* | 3/2013 | Wagner | B64D 33/00 307/9.1 |
| 2013/0086919 A1 | 4/2013 | Dooley et al. | |
| 2013/0139519 A1* | 6/2013 | Kesseli | F02C 9/26 60/773 |
| 2013/0219905 A1 | 8/2013 | Marconi et al. | |
| 2013/0233977 A1 | 9/2013 | Smiley et al. | |
| 2016/0311547 A1* | 10/2016 | Rossotto | B64D 31/06 |

OTHER PUBLICATIONS

Extended European Search Report issued in EP 16780659.5 dated Nov. 2, 2018 (6 pages).

* cited by examiner

SYSTEMS AND METHODS FOR STARTING AN ENGINE

CROSS REFERENCE TO RELATED APPLICATIONS

This application is a 35 U.S.C. § 371 National Phase Application of International PCT Patent Application No. PCT/US2016/027345, filed Apr. 13, 2016, which application claims the benefit of U.S. Provisional Patent Application Ser. No. 62/148,067, filed Apr. 15, 2015, and entitled SYSTEMS AND METHODS FOR STARTING AN ENGINE. The contents of both above referenced applications are incorporated herein by reference in their entirety.

BACKGROUND OF THE INVENTION

Field of the Invention

The present disclosure relates to systems for starting engines, and more particularly gas turbine engines in multi-engine rotorcraft.

Description of Related Art

A significant fuel economy benefit can be obtained for multi-engine rotorcraft if it is possible to shut down one engine during the cruise portion of a flight. In rotorcraft applications, a turbine engine that is shut down in flight needs to be re-started reliably and rapidly, for example, in the case of an operating engine failure or an increase in total vehicle power requirements. Traditional start/re-start systems that use electric or pneumatic motors can take between 20-30 seconds to bring the high-pressure spool up to speed for ignition. More time is then required for combustion to become self-sustaining before the engine can be used for powering the vehicle.

Such conventional methods and systems have generally been considered satisfactory for their intended purpose of ground starting. However, there is still a need in the art for improved methods and systems for starting an engine in-flight. The present disclosure provides a solution for this need.

SUMMARY OF THE INVENTION

A system for starting a gas turbine engine includes a rotor drive system and a hydraulic motor system operatively connected to the rotor drive system. A gas turbine engine is operatively connected to the hydraulic motor system for starting the gas turbine engine.

The hydraulic motor system can be operatively connected to the high-pressure spool of the gas turbine engine to start the gas turbine engine. The hydraulic motor system can be operatively connected to the high-pressure spool to continuously drive the high-pressure spool in a shutdown state in case rapid start is required. The hydraulic motor system can include a hydraulic pump operatively connected to the rotor drive system and a hydraulic motor operatively connected to and driven by the hydraulic pump. The hydraulic motor can be operatively connected to the high-pressure spool to continuously power the high-pressure spool for starting the gas turbine engine. An accumulator can be operatively connected to the hydraulic pump to store hydraulic power and the hydraulic motor can be operatively connected to the accumulator to be driven by the accumulator.

The gas turbine engine can be a first gas turbine engine of two gas turbine engines. A second gas turbine engine of the two gas turbine engines is operatively connected to the rotor drive system to drive the main rotor system and the tail rotor system. The second gas turbine engine can be operatively connected to the hydraulic motor system. The gas turbine engine can include a power take-off spool. The rotor drive system can include a clutch operatively connected between the power take-off spool and the rotor drive system to engage or disengage the power take-off spool as needed. The rotor drive system can include another clutch operatively connected between the hydraulic motor system and the high-pressure spool to engage or disengage the hydraulic motor system as needed. The clutches can be passive one-way clutches, controllable engagement clutches, or any combination thereof.

A method for starting an engine includes initiating single-engine-operation on a multi-engine aircraft. Single-engine operation includes operating a first engine and powering down a second engine. The method includes running a hydraulic motor system. The hydraulic motor system is driven by the rotor drive system and is operatively connected to the second engine. The method includes identifying a need to start the second engine and starting the second engine using the hydraulic motor system.

Running the hydraulic motor system can include continuously driving the high-pressure spool of the second engine with the hydraulic motor system during single-engine operation. Running the hydraulic motor system can include charging an accumulator during single-engine operation with the hydraulic motor system. Starting the second engine can include driving a high-pressure spool of the second engine with the accumulator after identifying the need to start the second engine. Running the hydraulic motor system can include driving the rotor drive system with the first engine. Identifying the need to start the second engine includes identifying a pilot request signal, a failure scenario, an increased power required scenario, and/or an unsafe operating environment. Starting the second engine can include driving the high-pressure spool of the second engine and bringing the high-pressure spool of the second engine up to a given rotational speed suitable for ignition using the hydraulic motor system, and/or suitable for self-sustaining combustion using the hydraulic motor system.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
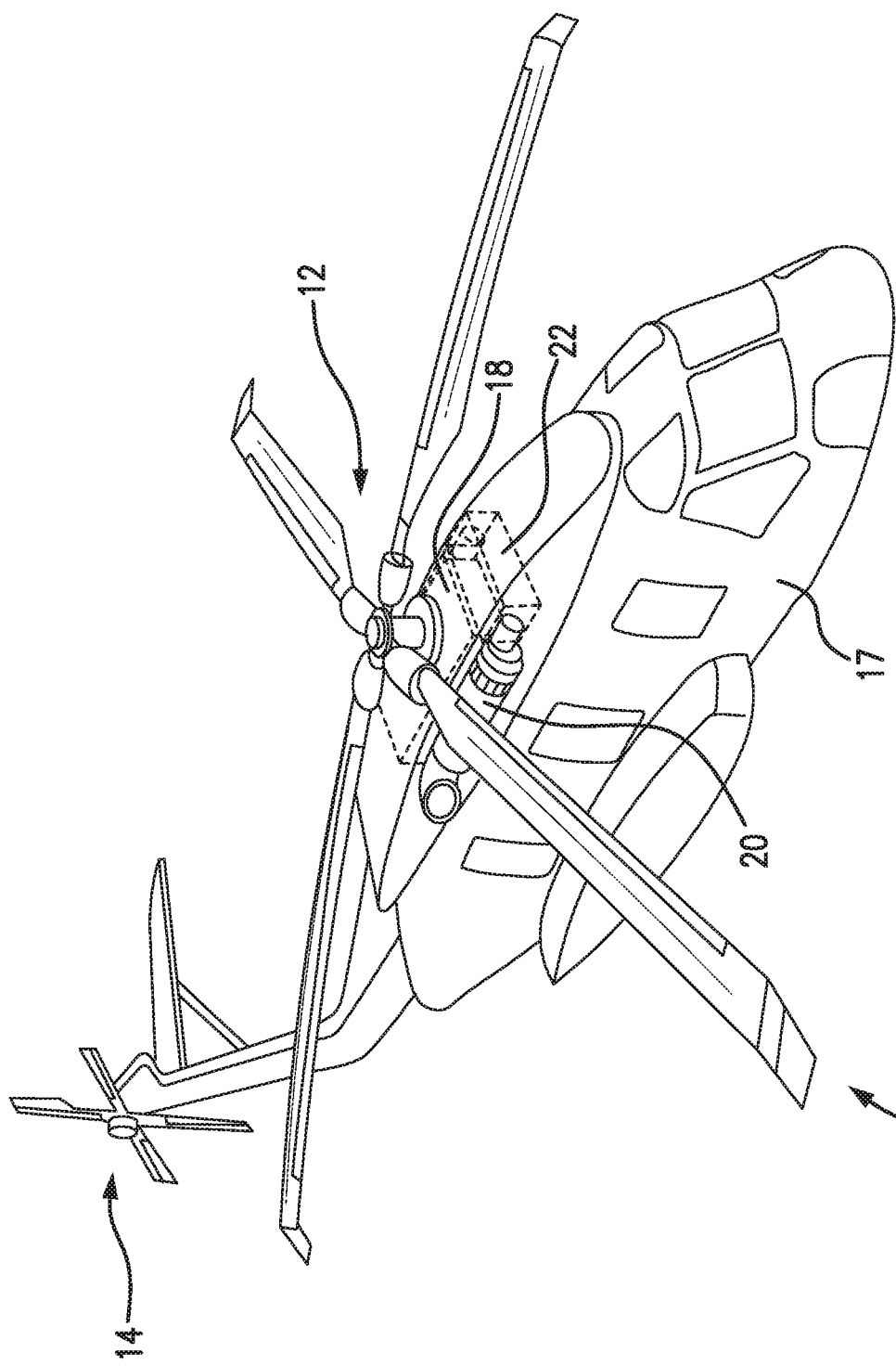
FIG. 1 is a schematic view of an exemplary embodiment of a vertical take-off and landing (VTOL) aircraft, showing a hydraulic motor system.

Reference will now be made to the drawings wherein like reference numerals identify similar structural features or aspects of the subject disclosure. For purposes of explanation and illustration, and not limitation, a partial view of an exemplary embodiment of a vertical takeoff and landing (VTOL) aircraft in accordance with the disclosure is shown in FIG. 1 and is designated generally by reference character 10. Other embodiments of VTOL aircraft in accordance with the disclosure, or aspects thereof, are provided in FIGS. 2-4, as will be described. The systems and methods described herein provide for reliable systems and methods for rapidly starting and re-starting gas-turbine engines, allowing pilots to take advantage of fuel savings associated with single-engine-operation (SEO), while still providing the same level of safety in case of engine failure.

Figure 2:
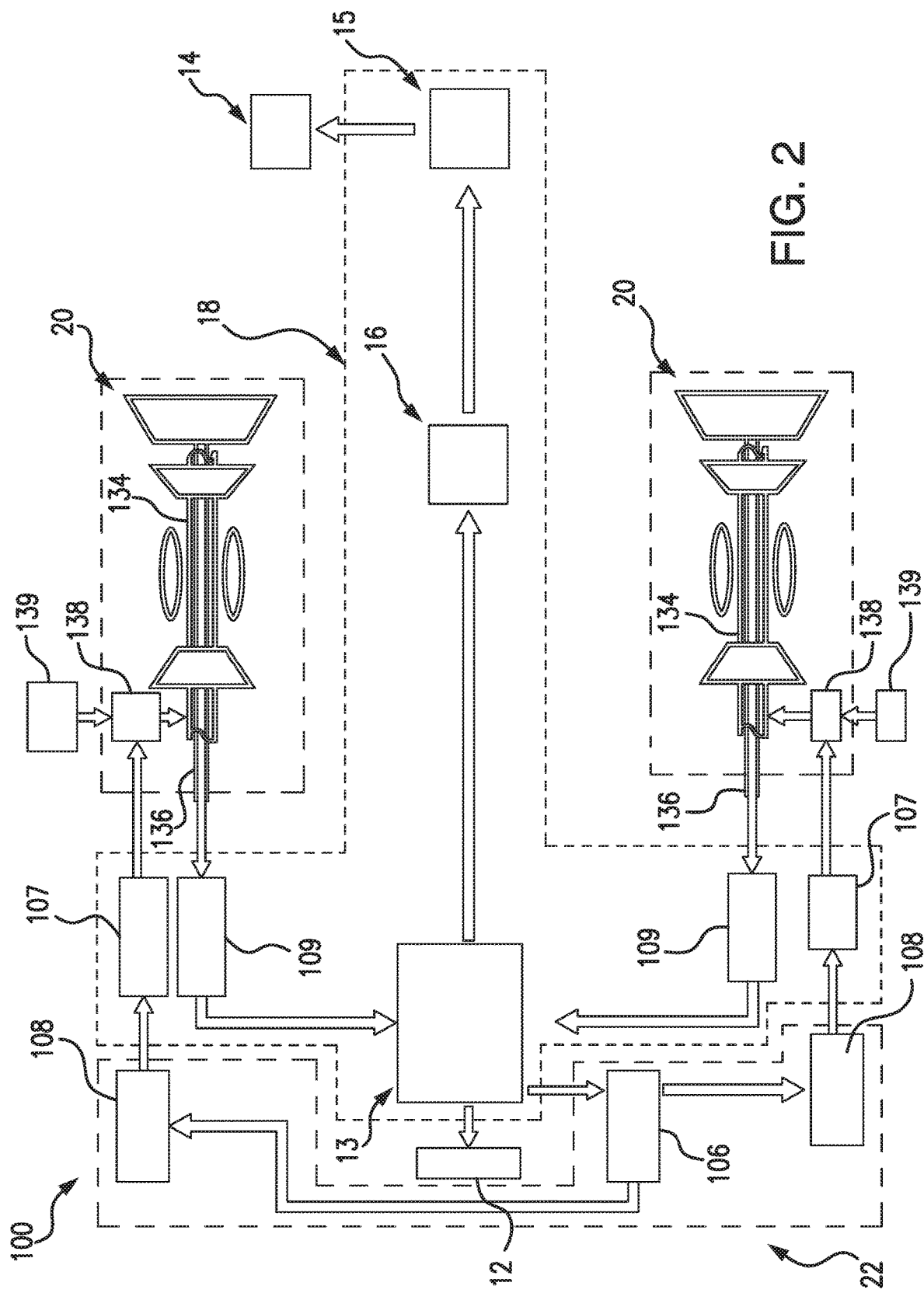
FIG. 2 is a schematic view of a system for starting one of the engines of the VTOL aircraft of FIG. 1, showing a hydraulic motor system operatively connected to a rotor drive system.

As shown in FIGS. 1 and 2. VTOL aircraft 10 includes a main rotor system 12 and tail rotor system 14 supported by an airframe 17. Airframe 17 also includes a rotor drive system 18 having a main rotor gearbox 13, an intermediate gearbox 16, a tail rotor gearbox 15, and any required connecting shaft systems. A hydraulic motor system 22 is operatively connected to with engines 20 and rotor drive system 18. Although a particular VTOL aircraft configuration is illustrated and described in the disclosed embodiment, other single and multi-engine configurations and/or machines that transmit mechanical power from internal combustion engines to a rotor system through a rotor drive system, whereby the rotor system provides the primary lift force in hover and the primary propulsive force in forward flight, and where the configurations exhibit a large disparity between the total vehicle power required for takeoff and hovering flight and the power required for sustained level flight at nominal cruise speeds, such as high speed compound rotary wing aircraft with supplemental translational thrust systems, dual contra-rotating, coaxial rotor system aircraft, turbo-props, tilt-rotors and tilt-wing aircraft, VTOL fixed wing aircraft that are oriented with their wings perpendicular to the ground plane during takeoff and landing, e.g. tail-sitter aircraft, and conventional takeoff and landing fixed wing aircraft, will also benefit from the present invention.

With reference now to FIG. 2, a system 100 for starting one of engines 20, e.g. gas turbine engines, includes rotor drive system 18. Hydraulic motor system 22 is operatively connected to rotor drive system 18 to be driven by rotor drive system 18. Engines 20 are operatively connected to hydraulic motor system 22 for rapid re-start should the flight scenario require it. Those skilled in the art will readily appreciate that hydraulic motor system 22 alleviates the need for additional shafting between rotor drive system 18 and engines 20, reducing weight and installation complexity. Mechanical connections via gears and shafts tend to be heavy or physically impossible to integrate in the available volume due to interference. The variety of installation configurations for hydraulic motor system 22 allows for system 22 to be installed as a kit to retrofit existing products.

With continued reference to FIG. 2, hydraulic motor system 22 is operatively connected to a high-pressure spool 134 of each of engine 20 to start engines 20. System 100 includes a clutch 107 between hydraulic motor system 22 and each engine 20, and an additional clutch 109 between each engine 20 and main rotor gear box 13. Those skilled in the art will readily appreciate that while hydraulic motor system 22 is connected to both engines 20, system 22 will generally only be driving one of the two engines 20. Hydraulic motor system 22 is operatively connected to high-pressure spool 134 of each engine 20 to continuously drive high-pressure spool 134 of one of engines 20 in a shutdown state in case rapid start is required. Hydraulic motor system 22 includes a hydraulic pump 106 operatively connected to rotor drive system 18 and respective hydraulic motors 108 operatively connected to and driven by hydraulic pump 106.

Clutch 109 is operatively connected between power take-off spool 136 and main rotor gearbox 13 to engage or disengage power take-off spool 136 as needed. During SEO, one of the two engines 20 is connected to drive system 18 to drive main rotor system 12, tail rotor system 14, and hydraulic motor system 22 via rotor drive system 18. Clutch 107 is operatively connected between hydraulic motor 108 and engine accessory gearbox 138. Engine accessory gear-box 138 is operatively connected to high-pressure spool 134. Engine accessory gearbox 138 is operatively connected to and driven by starter motor 139. Starter motor 139 is typical of a ground starting motor and can be retained for redundancy. Those skilled in the art will readily appreciate that the second engine 20 is connected to rotor drive system 18 through hydraulic motor system 22 to be powered by hydraulic motor system 22 when clutch 107 is engaged, or alternatively second engine 20 can be connected to rotor drive system 18 through hydraulic motor system 22 to be continuously powered by hydraulic motor system 22. It is contemplated that clutches 107 and 109 can be passive one-way clutches, controllable engagement clutches, or any combination thereof.

Figure 3:
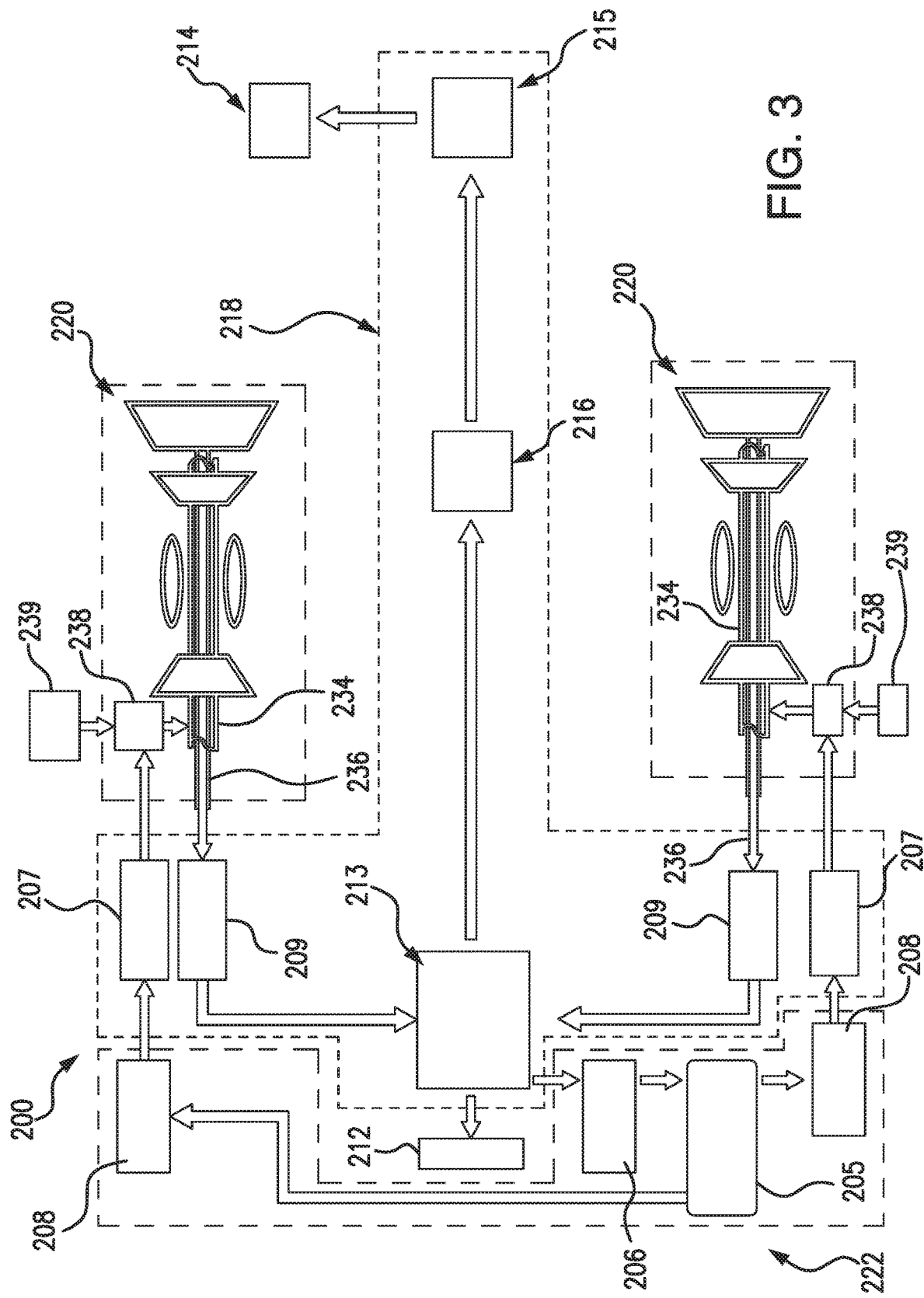
FIG. 3 is a schematic view of a system for starting one of the engines of the VTOL aircraft of FIG. 1, showing a hydraulic motor system having an accumulator.

As shown in FIG. 3, another exemplary embodiment of a hydraulic motor system 222 is shown. Hydraulic motor system 222 is similar to system 100 except that system 222 includes an accumulator 205 operatively connected between hydraulic pump 206 and each hydraulic motor 208 to store hydraulic power. Hydraulic motors 208 are operatively connected to accumulator 205 to be driven by accumulator 205 in the event their respective engines 220 need to be started from a shutdown state.

Figure 4:
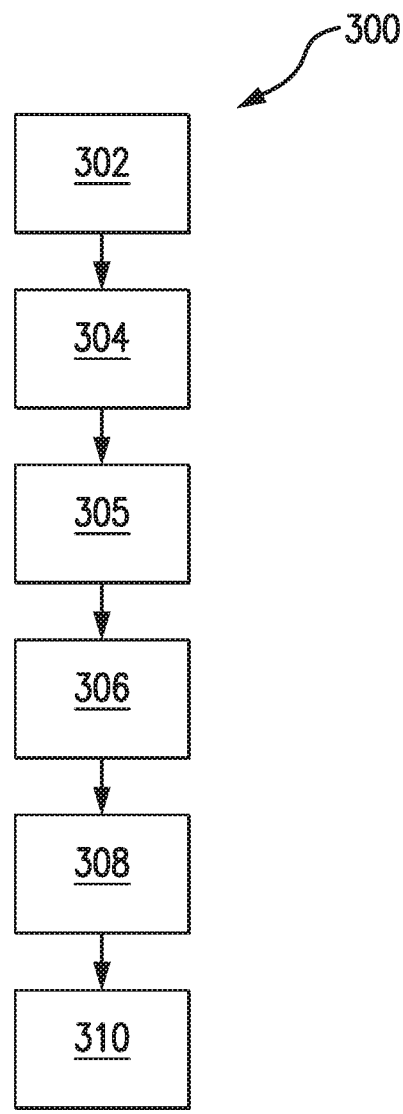
FIG. 4 is a flowchart of an exemplary method for starting an engine in accordance with the invention.

As shown in FIG. 4, a method for starting an engine 300 includes initiating SEO on a multi-engine aircraft, as indicated by box 302. Single-engine operation includes operating a first engine, e.g. one of engines 20, and powering down a second engine, e.g. the other engine 20. Method 300 includes running a hydraulic motor system, e.g. system 22, as indicated by box 304. Running the hydraulic motor system includes continuously driving a high-pressure spool, e.g. high-pressure spool 134, of the second engine with the hydraulic motor system during SEO, and/or charging an accumulator, e.g. accumulator 205, during SEO with the hydraulic motor system, as indicated by box 305. Running the hydraulic motor system includes driving a rotor drive system, e.g. rotor drive system 18, with the first engine to power the hydraulic motor system. Method 300 includes identifying a need to start the second engine, as indicated by box 306. Identifying the need to start the second engine includes identifying a pilot request signal, a failure scenario, for example when first engine fails, and/or an increased power required scenario, also as indicated by box 306.

With continued reference to FIG. 4, method 300 includes starting the second engine using the hydraulic motor system, as indicated by box 308. In systems including the accumulator, e.g. system 200, it is contemplated that starting the second engine includes driving the high-pressure spool of the second engine with the accumulator after identifying the need to start the second engine. Starting the second engine includes driving the high-pressure spool of the second engine and bringing the high-pressure spool of the second engine up to a given rotational speed suitable for ignition and/or self-sustaining combustion, as indicated by box 310.

The methods and systems of the present disclosure, as described above and shown in the drawings, provide for systems and methods for starting engines with superior properties including reduced start time, reduced weight and easy incorporation into existing aircraft configurations as compared with traditional start systems. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A system for starting a gas turbine engine comprising:
   a rotor drive system comprising a main rotor gearbox;
   a hydraulic motor system comprising a hydraulic motor and operatively connected to the rotor drive system;
   a first gas turbine engine and a second gas turbine engine, both operatively connected to the hydraulic motor system for starting the first gas turbine engine;
   an accumulator for storing hydraulic power, the accumulator being operatively connected to the first gas turbine engine and the second gas turbine engine;
   a first clutch operatively connected to the hydraulic motor and an engine accessory gearbox, the first clutch operatively connected to the first gas turbine engine via the engine accessory gearbox, and the engine accessory gearbox being operatively connected to a starter motor; and
   a second clutch operatively connected to a high-pressure spool and the main rotor gearbox, the high-pressure spool being operatively connected to the engine accessory gearbox,
   the hydraulic motor system configured to store hydraulic power at the accumulator during single-engine operation.

2. A system as recited in claim 1, wherein the hydraulic motor system is operatively connected to the high-pressure spool of the first gas turbine engine to start the first gas turbine engine.

3. A system as recited in claim 1, wherein the hydraulic motor system includes:
   a hydraulic pump operatively connected to the rotor drive system,
   the hydraulic motor being operatively connected to and driven by the hydraulic pump, wherein the hydraulic motor is operatively connected to the high-pressure spool of the first gas turbine engine to continuously power the high-pressure spool for starting the first gas turbine engine.

4. A system as recited in claim 1, wherein the hydraulic motor system includes:
   a hydraulic pump operatively connected to the rotor drive system;
   the hydraulic motor being operatively connected to the accumulator to be driven by the accumulator, wherein the hydraulic motor is operatively connected to the high-pressure spool of the first gas turbine engine to drive the high-pressure spool for starting the first gas turbine engine.

5. A system as recited in claim 1, wherein the hydraulic motor system is operatively connected to the high-pressure spool of the first gas turbine engine to continuously drive the high-pressure spool in a shutdown state in case rapid start is required.

6. A system as recited in claim 1, wherein the accumulator is operatively connected to the high-pressure spool of the first gas turbine engine.

7. A system as recited in claim 1, wherein the second gas turbine engine is operatively connected to the rotor drive system to drive a main rotor system and a tail rotor system.

8. A system as recited in claim 7, wherein the second gas turbine engine is operatively connected to the hydraulic motor system.

9. A system as recited in claim 1, wherein each clutch is at least one of a passive one-way clutch, or a controllable engagement clutch.

10. The system of claim 1, wherein the rotor drive system is powered by the hydraulic motor system when the first clutch is engaged, and wherein the second clutch is operatively connected to the high-pressure spool within the first engine.

11. The system of claim 1, wherein the second clutch is further operatively connected to a power take-off spool and is configured to engage or disengage the power take-off spool.

12. A method for starting an engine comprising:
    initiating single-engine operation on a multi-engine aircraft wherein single-engine operation includes operating a first engine and powering down a second engine;
    running a hydraulic motor system, wherein the hydraulic motor system is driven by a rotor drive system and includes a main rotor gearbox, and wherein the hydraulic motor system is operatively connected to the second engine via an engine accessory gearbox, the engine accessory gearbox being driven by a starter motor;
    identifying a need to start the second engine; and
    starting the second engine using a first clutch operatively connected to a hydraulic motor of the hydraulic motor system and the engine accessory gearbox;
    wherein running the hydraulic motor system includes charging an accumulator during single-engine operation;
    wherein the accumulator is configured to store hydraulic power, and wherein the accumulator is operatively connected to the first engine and the second engine;
    wherein the main rotor gearbox is operatively connected to a second clutch, which is further connected to a high-pressure spool, the high-pressure spool being further connected to the engine accessory gearbox.

13. A method for starting an engine as recited in claim 12, wherein running the hydraulic motor system includes continuously driving the high-pressure spool, which is connected to the second engine via the engine accessory gearbox, with the hydraulic motor system during single-engine operation.

14. A method for starting an engine as recited in claim 12, wherein starting the second engine includes driving the high-pressure spool, which is connected to the second engine via the engine accessory gearbox, with the accumulator after identifying the need to start the second engine.

15. A method for starting an engine as recited in claim 12, wherein running the hydraulic motor system includes driving the rotor drive system with the first engine.

16. A method for starting an engine as recited in claim 12, wherein identifying the need to start the second engine includes identifying a failure scenario.

17. A method for starting an engine as recited in claim 12, wherein identifying the need to start the second engine includes identifying an increased power required scenario.

18. A method for starting an engine as recited in claim 12, wherein identifying the need to start the second engine includes identifying a pilot request signal.

19. A method for starting an engine as recited in claim 12, wherein identifying the need to start the second engine includes identifying an unsafe operating environment.

20. A method for starting an engine as recited in claim 12, wherein starting the second engine includes driving a high-pressure spool of the second engine using the hydraulic motor system and bringing the high-pressure spool of the second engine up to a given rotational speed suitable for at least one of ignition or self-sustaining combustion.

\* \* \* \* \*